US008938722B2

(12) United States Patent
Dantam et al.

(10) Patent No.: US 8,938,722 B2
(45) Date of Patent: Jan. 20, 2015

(54) IDENTIFYING ERRORS USING CONTEXT BASED CLASS NAMES

(71) Applicant: International Business Machines Corporation, Armonk, NY (US)

(72) Inventors: Krishnamohan Dantam, Chelmsford, MA (US); Ravi K. Kosaraju, Johnston, RI (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/654,008

(22) Filed: Oct. 17, 2012

(65) Prior Publication Data

US 2014/0109065 A1    Apr. 17, 2014

(51) Int. Cl.
*G06F 9/44* (2006.01)
*G06F 11/36* (2006.01)

(52) U.S. Cl.
CPC ........ *G06F 11/3604* (2013.01); *G06F 11/3644* (2013.01); *G06F 11/3612* (2013.01); *G06F 2201/865* (2013.01)
USPC ............ 717/130; 717/124; 717/131; 717/116

(58) Field of Classification Search
CPC ............ G06F 11/3636; G06F 11/3466; G06F 11/3644; G06F 11/3604; G06F 11/3612; G06F 2201/865
See application file for complete search history.

(56) References Cited

U.S. PATENT DOCUMENTS

| | | | |
|---|---|---|---|
| 6,167,535 A | 12/2000 | Foote et al. | |
| 7,313,661 B1 | 12/2007 | Dmitriev | |
| 7,434,206 B2 | 10/2008 | Seidman et al. | |
| 7,451,434 B1 * | 11/2008 | Blumenthal et al. | 717/116 |
| 7,472,132 B2 | 12/2008 | Ho et al. | |
| 7,496,903 B2 * | 2/2009 | Rees et al. | 717/130 |
| 7,669,184 B2 * | 2/2010 | Bracha et al. | 717/116 |
| 7,743,280 B2 | 6/2010 | Brady | |
| 7,823,137 B2 * | 10/2010 | Chagoly et al. | 717/130 |
| 7,870,170 B2 | 1/2011 | Achanta et al. | |
| 2004/0015884 A1 * | 1/2004 | Shann et al. | 717/131 |
| 2004/0093588 A1 * | 5/2004 | Gschwind et al. | 717/130 |
| 2005/0268285 A1 * | 12/2005 | Bagley et al. | 717/124 |
| 2006/0048103 A1 * | 3/2006 | Archambault et al. | 717/131 |
| 2006/0123401 A1 * | 6/2006 | O'Brien et al. | 717/131 |

(Continued)

OTHER PUBLICATIONS

Chris Bailey, Debugging from dumps, 2011, p. 1-19.*

(Continued)

*Primary Examiner* — Thuy Dao
*Assistant Examiner* — Mongbao Nguyen
(74) *Attorney, Agent, or Firm* — Yee & Associates, P.C.; John R. Pivnichny

(57) ABSTRACT

A method and apparatus for locating errors is disclosed. A computer inserts an object reference into program code suspected of causing an error, the object reference having an initial class name. Responsive to execution of the program code, the computer generates a new class name for the object reference comprising the context information. The computer sets an object with the new class name as the object reference inserted into the program code suspected of causing the error, wherein the new class name of the object is located in computer memory in use by the executing program code. The computer then creates a record of the computer memory in use by the executing program code, the record including the context information in the form of the new class name of the object.

19 Claims, 6 Drawing Sheets

(56) References Cited

U.S. PATENT DOCUMENTS

| | | | |
|---|---|---|---|
| 2007/0028216 A1* | 2/2007 | Boss et al. | 717/124 |
| 2007/0294671 A1* | 12/2007 | Demetriou et al. | 717/124 |
| 2008/0109791 A1* | 5/2008 | Carteri et al. | 717/128 |
| 2009/0217303 A1* | 8/2009 | Grechanik et al. | 719/320 |
| 2010/0306739 A1* | 12/2010 | Schneider | 717/116 |
| 2011/0283265 A1* | 11/2011 | Gagliardi et al. | 717/130 |
| 2013/0173961 A1* | 7/2013 | Moser | 714/32 |

OTHER PUBLICATIONS

Maria Jump, Cork: Dynamic Memory Leak Detection for Java, 2006, pp. 1-9.*

Reed Hastings, Purify: Fast Detection of Memory Leaks and Access Errors, 1992, pp. 126-134.*

Indrajit Poddar, Memory leak detection and analysis in WebSphere Application Server: Part 2: Tools and features for leak detection and analysis, 2006, p. 1-15.*

* cited by examiner

IDENTIFYING ERRORS USING CONTEXT BASED CLASS NAMES

BACKGROUND

1. Field

The disclosure relates generally to locating an error in a computer. Still more particularly, the present disclosure relates to a method, apparatus, and computer program product for inserting object references into program code suspected of causing the error and then generating class names for the inserted object references using context information.

2. Description of the Related Art

Data processing systems provide computing resources, such as a computer that includes a central processing unit and computer memory. Executable programs are executed by the central processing unit in the computer using the computer memory. The executable programs use program objects located in the computer memory. During execution of the executable programs some program objects may cause errors, such as out of memory errors due to memory leaks. The errors however are not always due to the program objects themselves but rather the errors may be in how the program objects are being used.

Service teams are tasked with servicing errors in executable programs. Identifying an error in an executable program can be a difficult task for the service team. Service teams sometimes use a heap dump of computer memory at the time of the error to attempt to locate the error. However, identifying from the heap dump an error of the type where a use of program objects are causing errors can be very difficult. The reason for this difficulty is that the context of why and how particular program objects are being used when there is an error may be absent from the computer memory and thus absent from the heap dump when the error occurs.

Therefore, it would be advantageous to have a method, apparatus, and computer program product that takes into account at least some of the issues discussed above, as well as possibly other issues.

SUMMARY

In one illustrative embodiment, a method, apparatus, and computer program product for using context information to locate errors is provided. An apparatus inserts an object reference into program code suspected of causing an error, the object reference having an initial class name. Responsive to execution of the program code, the apparatus generates a new class name for the object comprising the context information. The apparatus sets an object with the new class name as the object reference inserted into the program code suspected of causing the error, wherein the new class name of the object is located in computer memory in use by the executing program code. The apparatus then creates a record of the computer memory in use by the executing program code, the record including the context information in the form of the new class name of the object.

DETAILED DESCRIPTION

Figure 1:
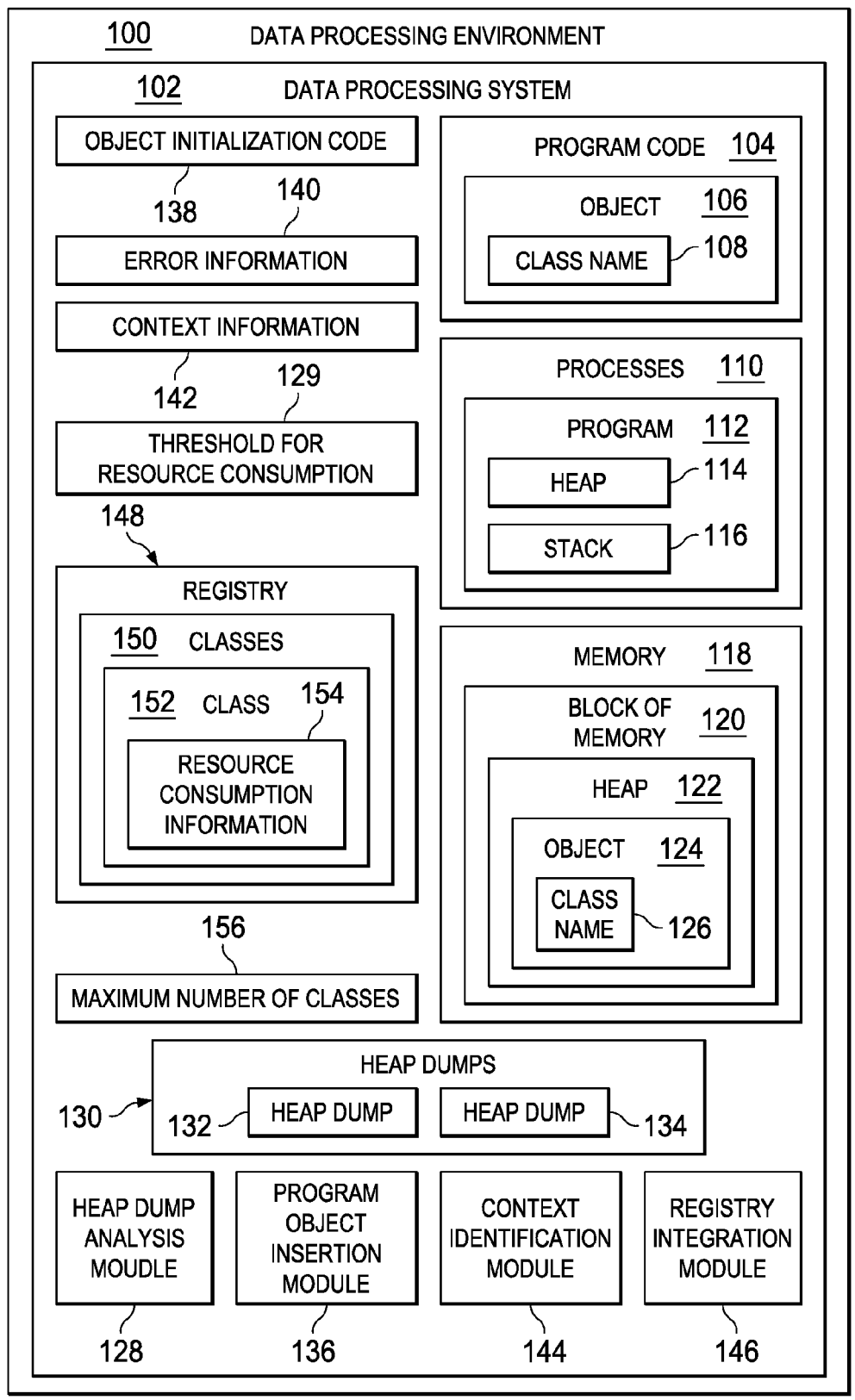
FIG. 1 is a block diagram of components involved in using context information to locate errors in a data processing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustration of components involved in using context information to locate errors in a data processing environment is depicted in accordance with an illustrative embodiment. In this illustrative example, data processing system 102 is present in data processing environment 100. Data processing system 102 may comprise a set of computers. A "set," as used herein with reference to items, means one or more items. For example, "set of computers" is one or more computers. When more than one computer is present in data processing system 102, those computers may be in communication with each other. This communication may be facilitated through a medium such as a network. This network may be, for example, without limitation, a local area network, a wide area network, an intranet, the internet, and some other suitable type of network.

In these illustrative examples, program code 104 may be located in data processing system 102. Program code 104 may comprise a number of program objects, such as object 106. Program code 104 may be written in any programming language suitable for execution on data processing systems such as data processing system 102. For example, a programming language for program code 104 may define syntax for creating program objects and references to program objects in program code 104. In these illustrative examples, object 106 may be a program object or a program object reference. The syntax used for program objects and program object references may vary significantly between different programming languages. For example, some object oriented programming languages may use classes as program objects and others may use data structures as program objects. Class name 108 for object 106 is a name of the type of class of object 106.

As depicted, data processing system 102 includes executing processes 110, such as instance of program 112. Processes 110 are instances of executable programs in a data processing system, such as data processing system 102. In these illustrative examples, program 112 is an instance of program code 104 running in data processing system 102. For example, program 112 may be executed by one or more processing units in one or more computers in data processing system 102 using heap 114 and stack 116 of in memory 118. Program 112 comprises program objects in the form of instances of objects, such as instance of object 106.

In these illustrative examples, instances of program objects are located in memory 118. Memory 118 may contain one or more blocks of memory, such as block of memory 120. As depicted, block of memory 120 may comprise one or more heaps such as heap 122. Heap 122 in block of memory 120 is heap 114 of program 112 where the instances of program objects such as object 124 are located. For example, when executable program code 104 is executing in data processing system 102 as program 112, block of memory 120 in memory 118 may comprise one or more heaps, such as heap 122 as the location in memory 118 for heap 114 associated with program 112. In these illustrative examples, class name 126 of object 124 is initially set to class name 108. A "heap," as used herein means a portion of a block of memory allocated to an instance of a program for storing program objects. A "stack," as used herein means a portion of a block of memory allocated to an instance of a program for storing program objects allocated for function calls.

In these illustrative examples, heap dump analysis module 128 is present in data processing system 102 and uses heap dumps 148, such as heap dump 132 and heap dump 134 to identify program code suspected of causing errors. For example, in a process for identifying errors in heap dump 132, heap dump analysis module 128 may use information about program objects in heap dump 132 to identify objects suspected as causing an error in data processing system 102. As another example, a user of heap dump analysis module 128 may use heap dump analysis module 128 to manually select the class names of program objects as program code for further analysis. In these examples, the program objects suspected of causing errors may be instances of program code, such as program code 104. Further in these examples, the error may be identification of program code that exceeds threshold for resource consumption 129. For example, the error may be associated with a memory leak, such as instances of program code 104 accumulating in error in heap 122.

As depicted, program object insertion module 136 is also present in data processing system 102. Subsequent to the identification of program code suspected of causing an error, program object insertion module 136 inserts objects into identified program code. For example, program object insertion module 136 may insert object 106 into program code 104. In this example the initial class name of object 106 is set to class name 108. In these illustrative examples, program object insertion module 136 may insert an object or object reference by modifying program code, such as by using byte code insertion or any other suitable means for modifying program code in data processing environment 100.

In these illustrative examples, object 106 in program code 104 is associated by class name 108 with object initialization code 138. Object 106 in program code 104 causes the execution of object initialization code 138 during the initialization of program code 104. For example, subsequent to program 138 being executed in data processing system 102, program code 104 is initialized causing object 106 to also be initialized which results in the execution of initialization code 138 in data processing system 102. In these illustrative examples, object initialization code 138 begins a process for generating a new class with a new class name using context information and setting the new class as the object referred to by object 106. For example, object initialization code 138 sets the object 106 as an instance of object 124 having generated class name 126 using context information associated with program 112, such as error information 112.

Context identification module 144 identifies information associated with program code 104 in data processing system 102, such as error information 140 and context information 142. In these illustrative example, context information 142 may include a user name associated with program 112, an internet protocol address associated with program 112, and a time when object 124 is initialized causing a generation of a new class name for object 124 as class name 126, and any other information suitable for context information in data processing environment 100. In these illustrative examples error information 140 may include an identifier assigned to a problem reported by a user of program code 104, a date and time of an error, an error code identifying a type of error of the error, and any other information suitable for error information in data processing environment 100.

In these illustrative examples, generated class name 126 of object 124 indicates the error information 140 and context information 142. For example, responsive to setting class name 126 of object 124 as a generated class name that includes selected portions of error information 140 and context information 142, data processing system 102 may generate heap dump 134. In this example, heap dump 134 includes generated class name in heap dump 134. More particularly, generated class name in heap dump 134 identifies error information and context information associated with an error caused by program code 104.

Registry integration module 146 in data processing system 102 retrieves and stores classes 150 in registry 148. As depicted, classes 150 in registry 148 may include classes as class names generated by data processing system 102. For example, responsive to generating a new class name that includes selected portions of error information 140 and context information 142 as the generated class name for class name 126 for object 124, registry integration module 146 may store the newly generated class name in registry 148 as class 152. As depicted, prior to adding a new class to classes 150 registry integration module may determine if the new class already exists in classes 150 and also determine if the number of classes in classes 150 is less than maximum number of classes 156. In these illustrative examples, responsive to maximum number of classes 156 not being reached and further responsive to the new class is not yet in registry 148 registry integration module adds the newly generated class to classes 150.

As depicted, resource consumption information 154 for each class in classes 150 comprises an amount of resources consumed by each instance of each class in classes 150. For example, in a process for locating errors in data processing environment 100, data processing system 102 may determine an amount of resources consumed by each instance of class 152 and add the amount to resource consumption information 154.

The illustration of data processing environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example data processing system 102 may be a local area network (LAN), a wide area network (WAN), an intranet, the Internet, or some combination thereof. As another example, in a failover process where program code 104 is being terminated by data processing system 102 it would be advantageous to create a heap dump that includes class name 126. In this example, it would be advantageous to watch for terminations of instances of program code 104 that have modified class names for program objects in memory 118.

Figure 2:
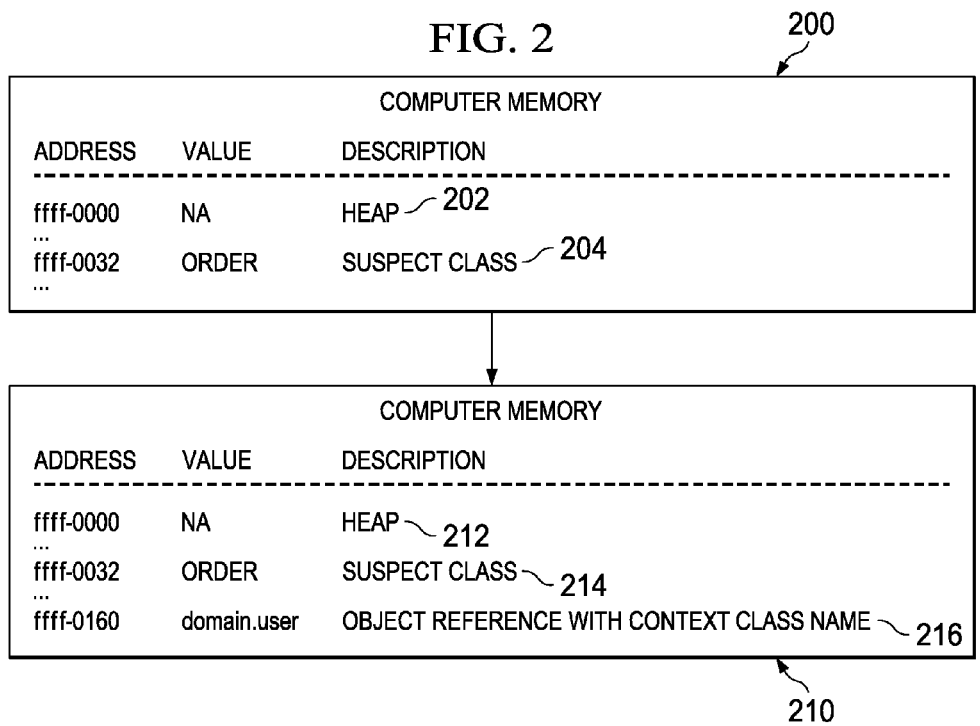
FIG. 2 is a table showing an example of the contents of computer memory involved in a process for generating object class names in the memory in accordance with an illustrative embodiment.

Turning next to FIG. 2, an illustrative example of the contents of memory involved in a process for generating object class names in the memory is depicted in table form in accordance with an illustrative embodiment. Computer memory 200 is an example of memory 118 in FIG. 1. In particular, heap 202 is an example of heap 122 in FIG. 1 of block of memory 120 in FIG. 1 for program 112 in FIG. 1. More particularly, suspect class 204 in heap 202 is an example of program code suspected of causing an error such as program code 104 in FIG. 1. In this illustrative example, suspect class 204 is named "ORDER."

Computer memory 210 is another example of memory 118 in FIG. 1. More particularly, computer memory 210 is an example of memory 118 at a later time than the example of memory 118 shown in computer memory 200. In this example, computer memory 210 shows heap 212 as an example of heap 122 in FIG. 1 of block of memory 120 in FIG. 1 for program 112 in FIG. 1 and suspect class 214 in heap 212 as an example of program code suspected of causing an error such as program code 104 in FIG. 1. In this illustrative example, object 216 is an example of object 124 in FIG. 1. As depicted, the class name of object 216 includes context information associated with suspect class 214. More particularly, the name of object 216 is stored at address ffff-0160 in computer memory 210 and comprises a value for the name of object 216 that has been set to "domain.user." For example, domain may be a domain name associated with data processing environment 100 and user may be user identifier associated with data processing environment 100.

Figure 3:
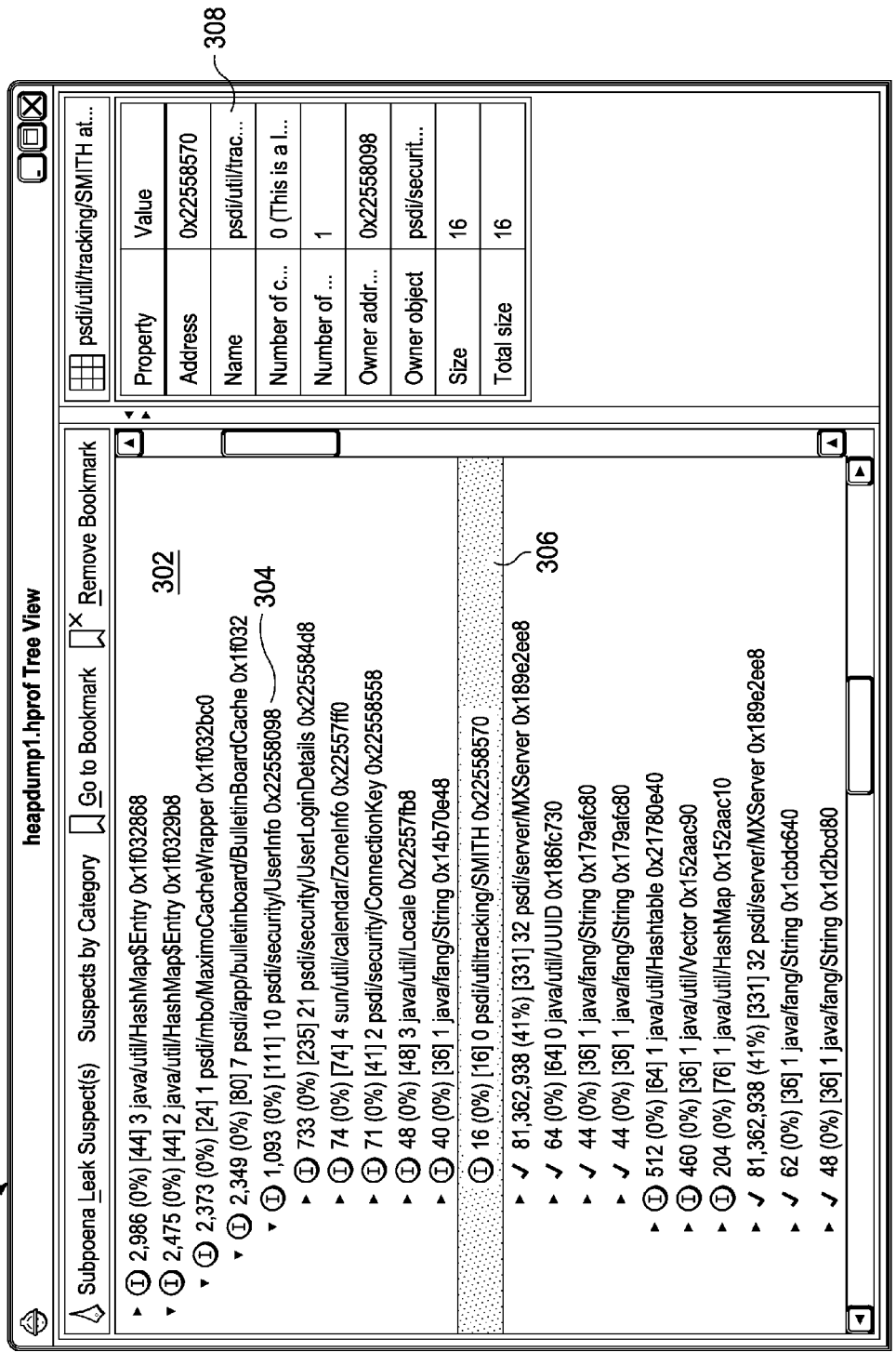
FIG. 3 is a illustration of a user interface for browsing a heap dump comprising program objects in accordance with an illustrative embodiment.

Turning next to FIG. 3, an example of a graphical user interface for browsing a heap dump comprising program objects is depicted in accordance with an illustrative embodiment. User interface window 300 is an illustrative example of a computer display of a data processing system such as data processing system 102 in FIG. 1. More particularly, user interface window 300 is an illustrative example of a user interface window for heap dump analysis module 128 in FIG. 1.

As depicted, user interface window 300 comprises tree view 302 of a heap dump, such as heap dump 134 in FIG. 1. As shown, a user has selected to see more detail for UserInfo 304. In this illustrative example, UserInfo 304 is an example of program code 104 in FIG. 1. Also in this illustrative example psd/util/tracking/SMITH 306 is an example of class name 126 in FIG. 1 of object 124 in FIG. 1. In this illustrative example, object 124 has been inserted into UserInfo 304 by program object insertion module 136 in FIG. 1. As shown, a user has further selected to see more detail for psd/util/tracking/SMITH 306. In this illustrative example, when a user selects an entry in the tree view 302, property window 308 shows values for properties for the inserted object. For example, responsive to a user selecting inserted object 124 by selecting the entry psd/util/tracking/SMITH 306 property window 308 shows information for object 124 as values of properties for object 124.

As depicted, this illustrative example shows a user browsing a heap dump using interface window 300. Then, based on context information as the name of an object inserted into program code suspected of causing an error, the user is subsequently shown that a user named Smith is associated with the suspected program code. The context information was added to the display of the heap dump by the insertion of the object and by the setting of the class name of the object to include the user name as context information for the program code suspected of causing the error.

Figure 4:
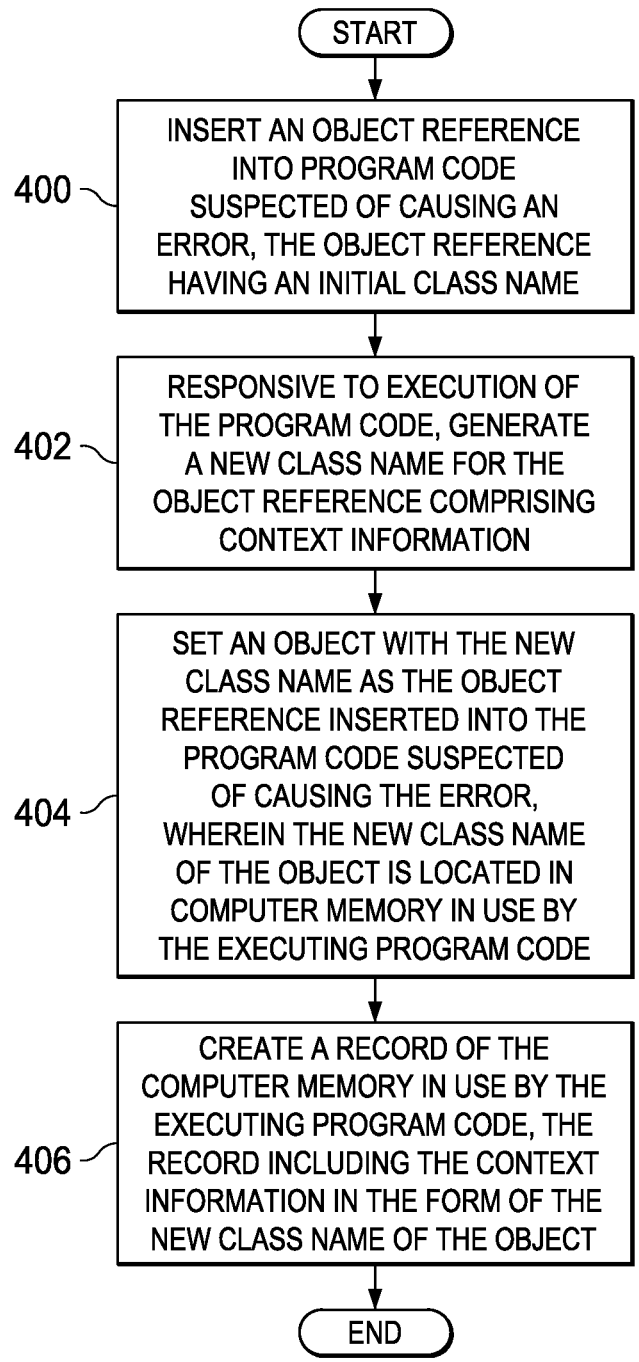
FIG. 4 is a flow chart of a process for using context information to locate errors in accordance with an illustrative embodiment.

With reference now to FIG. 4, an illustrative example of a flowchart of a process for using context information to locate errors is depicted in accordance with an illustrative embodiment. The steps in FIG. 4 may be implemented in data processing environment 100 in FIG. 1. In particular, the steps may be implemented in software, hardware, or a combination of the two in heap dump analysis module 128, program object insertion module 136, context identification module 144, and object initialization code 138 in FIG. 1 in data processing system 102 in FIG. 1.

The process begins by inserting an object reference into program code suspected of causing an error (step 400). In this illustrative example, the object reference is an example of object 106 in FIG. 1 inserted into program code 104 in FIG. 1. The object reference inserted into the program code has an initial class name, such as class name 108 in FIG. 1. For example, the error may be a software error, the program code may a portion of a java application, and the software error may cause the java application to stop running.

Responsive to execution of the program code, the process generates a new class name for the object reference comprising context information (step 402). For example, the context information may comprise portions selected from context information 142 and error information 140 in FIG. 1. The process then sets an object with the new class name as the object referred to by the object reference inserted into the program code suspected of causing the error, wherein the new class name of the object is located in computer memory in use by the executing program code (step 404). For example, when the new class name for the object reference is generated, a new object instance for a new class having the new class name may also be generated.

The process then creates a record of the computer memory in use by the executing program code, the record including the context information in the form of the new class name of the object (step 406) with the process terminating thereafter. In this illustrative example, the record of the computer memory in use by the executing program code is an example of heap dump 134 in FIG. 1 of memory 118 in FIG. 1.

Figure 5:
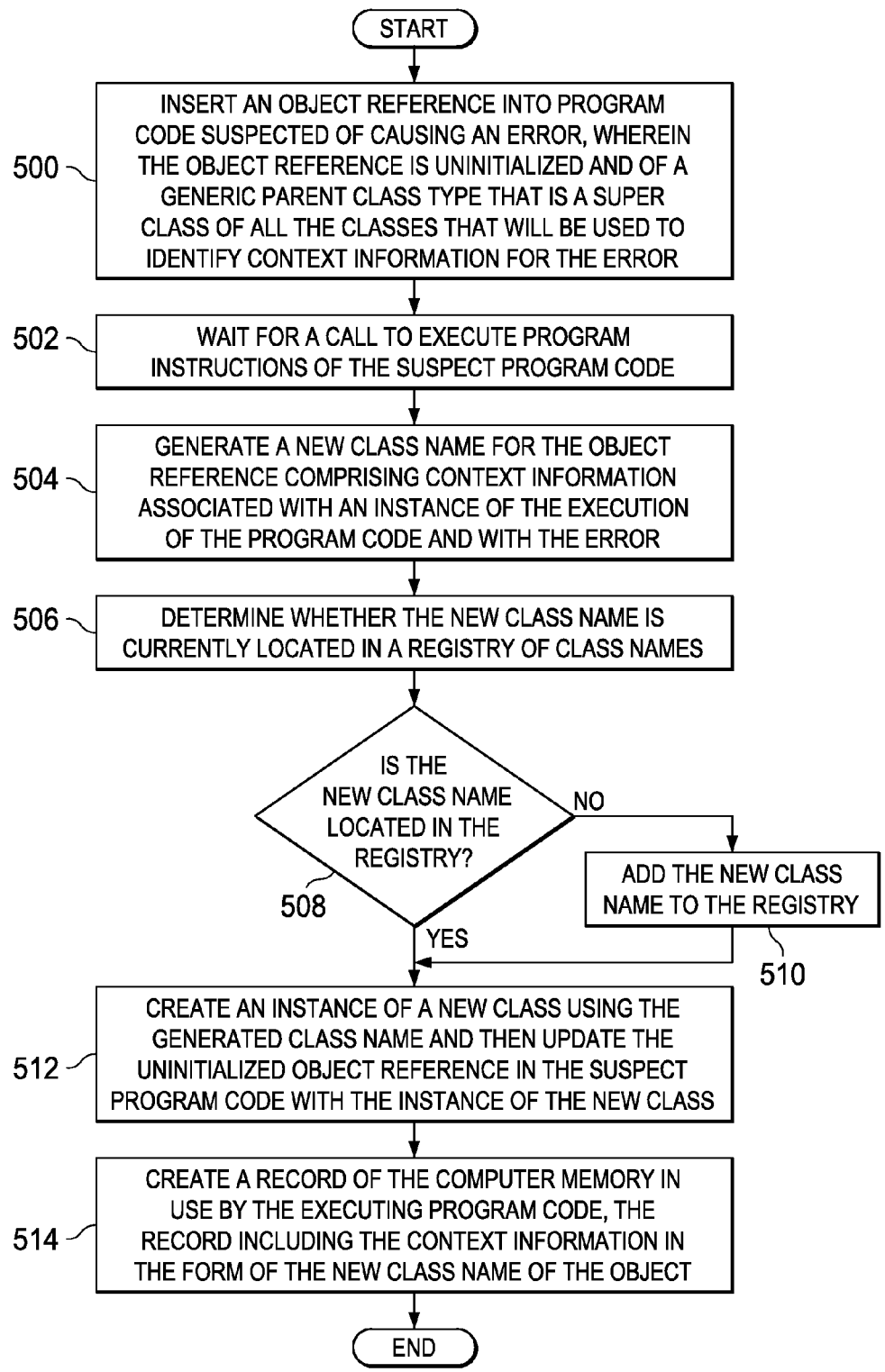
FIG. 5 is a more detailed flow chart of the process for using context information to locate errors in accordance with an illustrative embodiment.

With reference now to FIG. 5, an illustrative example of a flowchart of a process for using context information to locate errors is depicted in accordance with an illustrative embodiment. The steps in FIG. 5 may be implemented in data processing environment 100 in FIG. 1. In particular, the steps may be implemented in software, hardware, or a combination of the two in heap dump analysis module 128, program object insertion module 136, context identification module 144, registry integration module 146, and object initialization code 138 in FIG. 1 in data processing system 102 in FIG. 1.

The process begins by inserting an object reference into program code suspected of causing an error, wherein the object reference is uninitialized and of a generic parent class type that is a super class of all the classes that will be used to identify the context information for the error (step 500). The process waits for a call to execute program instructions of the suspect program code (step 502). The process generates a new class name for the object reference comprising context information associated with an instance of the execution of the program code and with the error (step 504). The process next determines whether the new class name is currently located in a registry of class names (step 506). Subsequent to identifying the new class name is not located in the registry the process adds the new class name to the registry (step 510).

The process next creates an instance of a new class using the generated class name and then updates the uninitialized object reference in the suspect program code with the instance of the new class (step 512). The process then creates a record of the computer memory in use by the executing program code, the record including the context information in the form of the new class name of the object (step 514) with the process terminating thereafter.

Figure 6:
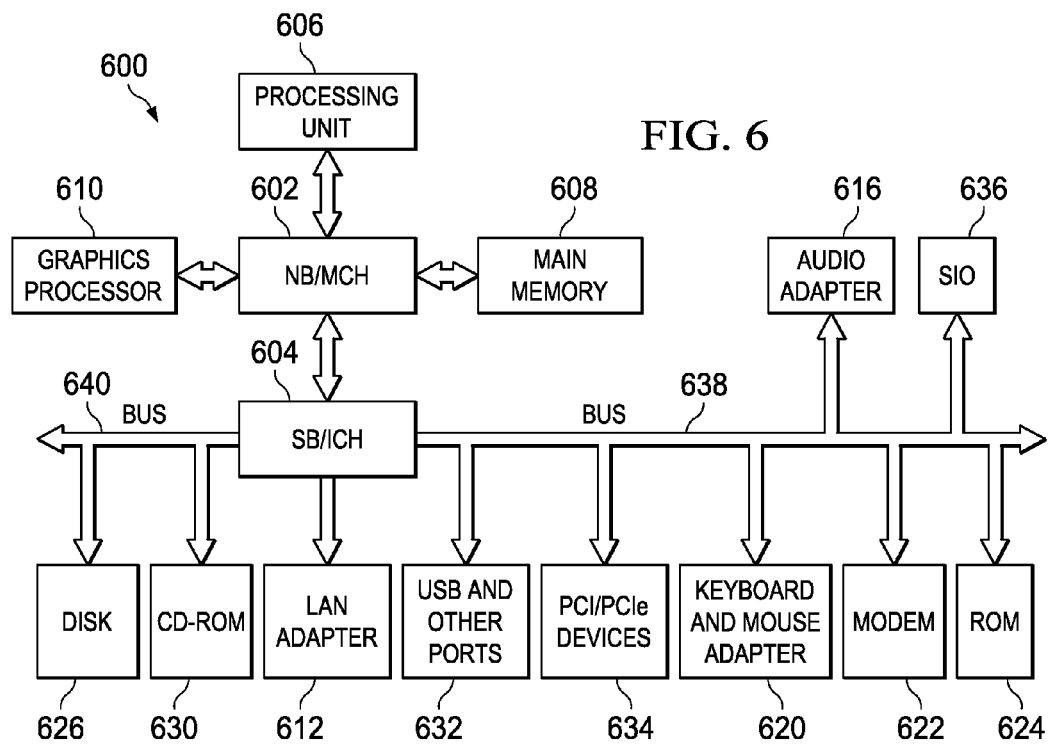
FIG. 6 is an illustration of a data processing system in accordance with an illustrative embodiment.

Referring to FIG. 6, a block diagram of a computer or data processing system is shown in which aspects of the present invention may be implemented. This system is an example of a computer which may be used to implement components of FIG. 1, such as heap dump analysis module 128, program object insertion module 136, context identification module 144, registry integration module 146, registry 148, data processing system 102, and processes 110, and in which computer usable code or instructions implementing the processes for embodiments of the present invention may be located.

In the depicted example, the data processing system of FIG. 6 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, disk 626, CD-ROM 630, universal serial bus (USB) ports and other communication ports 632, and PCI/PCIe devices 634 connect to SB/ICH 604 through bus 638 and bus 640. PCI/PCIe devices 634 may include, for example, Ethernet adapters, add-in cards, and PC cards for notebook computers. PCI uses a card bus controller, while PCIe does not. ROM 624 may be, for example, a flash binary input/output system (BIOS).

Disk 626 and CD-ROM 630 connect to SB/ICH 604 through bus 640. Disk 626 and CD-ROM 630 may use, for example, an integrated drive electronics (IDE) or serial advanced technology attachment (SATA) interface. Super I/O (SIO) device 636 may be connected to SB/ICH 604.

An operating system runs on processing unit 606 and coordinates and provides control of various components within the data processing system of FIG. 6. As a client, the operating system may be a commercially available operating system such as Microsoft® Windows® (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on the data processing system (Java is a trademark of Sun Microsystems, Inc. in the United States, other countries, or both).

As a server, the data processing system of FIG. 6 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). The data processing system may be a symmetric multiprocessor (SMP) system including a plurality of processors in processing unit 606. Alternatively, a single processor system may be employed.

Instructions for the operating system, the object-oriented programming system, and applications or programs are located on storage devices, such as disk 626, and may be loaded into main memory 608 for execution by processing unit 606. The processes for embodiments of the present invention are performed by processing unit 606 using computer usable program code, which may be located in a memory such as, for example, main memory 608, ROM 624, or in one or more peripheral devices, such as, for example, disk 626 and CD-ROM 630.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for using context information to locate errors.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for using context information to locate errors, the method comprising:
   inserting, by a computer, an object reference into program code suspected of causing an error, the object reference having an initial class name;
   responsive to execution of the program code, the computer generating a new class name for the object reference comprising the context information;
   setting, by the computer, an object with the new class name as the object reference inserted into the program code suspected of causing the error, wherein the new class name of the object is located in computer memory in use by the executing program code; and
   creating, by the computer, a record of the computer memory in use by the executing program code, the record including the context information in the form of the new class name of the object, wherein the computer generating the new class name for the object reference comprising the context information includes:
   the computer determining whether the new class name is currently located in a registry of class names;
   the computer determining whether a number of classes in the registry is less than a maximum number of classes; and
   responsive to determining the new class name is not located in the registry, and the number of classes in the registry is less than the maximum number of classes, the computer adding the new class name to the registry.

2. The method of claim 1, wherein the computer generating the new class name for the object reference comprising the context information is further responsive to:
   execution of program instructions associated with initialization of objects having the initial class name.

3. The method of claim 1, wherein the computer memory in use by the executing program code is a heap in the computer memory allocated to the program code, and wherein the record of the heap is made in the form of a heap dump.

4. The method of claim 1, wherein the context information is associated with an instance of the execution of the program code.

5. The method of claim 4, wherein the context information associated with the instance of the execution of the program code is selected from a user name associated with the instance, an internet protocol address associated with the instance, and a time when the new class name for the object was generated.

6. The method of claim 1, wherein the context information is associated with the error.

7. The method of claim 6, wherein the context information associated with the error is selected from an identifier assigned to a problem reported by a user of the program code, a date and time of the error, an error code identifying a type of error of the error.

8. The method of claim 1 wherein the error is a software error, the program code is a portion of a java application, and the software error causes the java application to stop running.

9. The method of claim 1, further comprising:
identifying, by the computer, the program code suspected of causing the error.

10. The method of claim 9, wherein identifying, by the computer, the program code suspected of causing the error comprises:
identifying, by the computer, resource consumption by classes of objects in a heap dump;
determining, by the computer, whether the resource consumption by a particular class of objects in the heap dump exceeds a threshold of resource consumption; and
selecting, by the computer, the program code based on an association of the program code with the particular class of objects that exceeds the threshold of resource consumption.

11. The method of claim 10 wherein the computer memory in use by the executing program code is a heap in the computer memory allocated to the program code, and wherein the record of the heap is made in the form of a new heap dump, and further comprising:
identifying, by the computer, the context information of the new class name of the object in the new heap dump as information associated with the resource consumption that exceeded the threshold of resource consumption.

12. An apparatus, comprising:
a processor unit, a memory, and a computer readable storage device;
first program instructions to insert an object reference into program code suspected of causing an error, the object reference having an initial class name;
second program instructions, responsive to execution of the program code, to generate a new class name for the object reference comprising the context information;
third program instructions to set an object with the new class name as the object reference inserted into the program code suspected of causing the error, wherein the new class name of the object is located in computer memory in use by the executing program code; and
fourth program instructions to create a record of the computer memory in use by the executing program code, the record including the context information in the form of the new class name of the object, wherein the first program instructions, the second program instructions, the third program instructions, and the fourth program instructions are stored in the computer readable storage device for execution by the processor unit via the memory, wherein the second program instructions to generate the new class name for the object reference comprising the context information includes:
program instructions to determine whether the new class name is currently located in a registry of class names;
program instructions to determine whether a number of classes in the registry is less than a maximum number of classes; and
program instructions, responsive to determining the new class name is not located in the registry, and the number of classes in the registry is less than the maximum number of classes, to add the new class name to the registry.

13. The apparatus of claim 12, wherein the second program instructions to generate the new class name for the object reference comprising the context information is further responsive to execution of program instructions associated with initialization of objects having the initial class name.

14. The apparatus of claim 12, further comprising:
fifth program instructions to identify resource consumption by classes of objects in a heap dump;
sixth program instructions to determine whether the resource consumption by a particular class of objects in the heap dump exceeds a threshold of resource consumption, wherein exceeding the threshold of resource consumption is the error; and
seventh program instructions to select the program code based on an association of the program code with the particular class of objects that exceeds the threshold of resource consumption, wherein the fifth program instructions, the sixth program instructions, and the seventh program instructions are stored in the computer readable storage device for execution by the processor unit via the memory.

15. The apparatus of claim 14, wherein the computer memory in use by the executing program code is a heap in the computer memory allocated to the program code, and wherein the record of the heap is made in the form of a new heap dump, and further comprising:
eighth program instructions to identify the context information of the new class name of the object in the new heap dump as information associated with the resource consumption that exceeded the threshold of resource consumption, wherein the eighth program instructions are stored in the computer readable storage device for execution by the processor unit via the memory.

16. A computer program product for using context information to locate errors, the computer program product comprising:
a non-transitory computer readable storage device;
program instructions, stored on the computer readable storage device, for inserting an object reference into program code suspected of causing an error, the object reference having an initial class name;
program instructions, stored on the computer readable storage device, responsive to execution of the program code, for generating a new class name for the object reference comprising the context information;
program instructions, stored on the computer readable storage device, for setting an object with the new class name as the object reference inserted into the program code suspected of causing the error, wherein the new class name of the object is located in computer memory in use by the executing program code; and
program instructions, stored on the computer readable storage device, for creating a record of the computer memory in use by the executing program code, the record including the context information in the form of the new class name of the object, wherein the program instructions for generating the new class name for the object reference comprising the context information includes:
program instructions for determining whether the new class name is currently located in a registry of class names;
program instructions for determining whether a number of classes in the registry is less than a maximum number of classes; and
program instructions, responsive to determining the new class name is not located in the registry, and the number of classes in the registry is less than the maximum number of classes, for adding the new class name to the registry.

17. The computer program product of claim 16, generating the new class name for the object reference comprising the context information is further responsive to execution of program instructions associated with initialization of objects having the initial class name.

18. The computer program product of claim 16, further comprising:
- program instructions, stored on the computer readable storage device, for identifying resource consumption by classes of objects in a heap dump;
- program instructions, stored on the computer readable storage device, for determining whether the resource consumption by a particular class of objects in the heap dump exceeds a threshold of resource consumption, wherein exceeding the threshold of resource consumption is the error; and
- program instructions, stored on the computer readable storage device, for selecting the program code based on an association of the program code with the particular class of objects that exceeds the threshold of resource consumption.

19. The computer program product of claim 18, wherein the computer memory in use by the executing program code is a heap in the computer memory allocated to the program code, and wherein the record of the heap is made in the form of a new heap dump, and further comprising:
- program instructions, stored on the computer readable storage device, for identifying the context information of the new class name of the object in the new heap dump as information associated with the resource consumption that exceeded the threshold of resource consumption.

* * * * *